United States Patent [19]

Soe

[11] 3,831,284

[45] Aug. 27, 1974

[54] METHOD AND ARRANGEMENT FOR STRIPPING TEXT AND ILLUSTRATION FOILS

[75] Inventor: Hartvig Soe, Alvsjo, Sweden

[73] Assignee: Misomex Aktiebolag, Hagersten, Sweden

[22] Filed: Oct. 8, 1970

[21] Appl. No.: 79,175

[30] Foreign Application Priority Data

Oct. 24, 1969 Sweden .......... 14612/69

[52] U.S. Cl. .......... 33/184.5, 96/41
[51] Int. Cl. .......... B41b 1/00
[58] Field of Search .......... 33/184.5; 96/36, 41

[56] References Cited

UNITED STATES PATENTS

| | | | |
|---|---|---|---|
| 1,208,340 | 12/1916 | Little | 33/79 B |
| 2,512,937 | 6/1950 | Hartman | 33/184.5 |
| 2,825,142 | 3/1958 | Johnson | 33/184.5 |
| 2,907,274 | 10/1959 | Taylor | 33/184.5 X |
| 3,176,601 | 4/1965 | Bradley | 33/184.5 X |
| 3,239,940 | 3/1966 | Berkowitz | 33/184.5 |

*Primary Examiner*—William D. Martin, Jr.
*Attorney, Agent, or Firm*—Larson, Taylor & Hinds

[57] ABSTRACT

An apparatus is provided for mounting text or illustration film foils, and, in particular, part-color film foils of color separated color pictures, onto a number of strip foils so that various part-color film foils of the same picture accurately register with one another. The apparatus includes a mounting table on which the strip foil is precisely positioned and mounting arm for mounting a film foil to be attached to the strip foil in a desired position thereon. The mounting arm is universally movable in a horizontal plane, lockable in a position in that plane, and pivotable with respect to the table, such that a further film foil can be mounted in precisely the same position on the strip foil as the previous film foil.

7 Claims, 3 Drawing Figures

METHOD AND ARRANGEMENT FOR STRIPPING TEXT AND ILLUSTRATION FOILS

Figure 1:
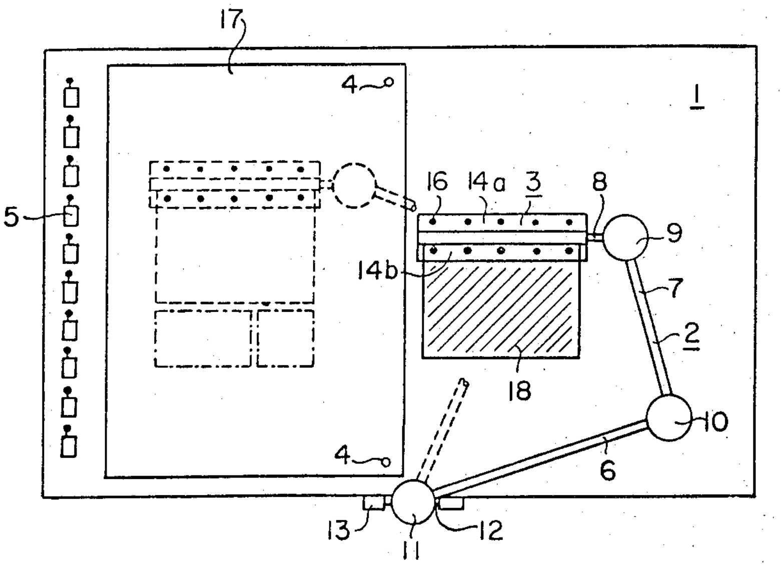

The present invention refers to a method and an arrangement for stripping text and illustration foils in particular part colour foils of colour separated colour pictures onto a strip foil, so that the various part colour foils of one and the same picture mounted on each one strip foil with great accuracy will register with each other.

It is obvious that the invention may be applied for many various purposes and within many various fields, but for the sake of simplicity it will below only be described with reference to stripping of part colour foils of one and the same colour picture onto strip foils which are intended to be used as print originals in copying the various strippings onto intaglio printing rollers, offset plates and the like.

In stripping part colour foils of colour separations it is known in the art to manually strip each part colour foil into register onto a strip foil adapted to a light table. In order to enable a correct mounting of the part colour foils onto the strip foil said strip foil has either been provided with drawn patterns, register marks or the like for each part colour foil or a pattern, layout or the like has been adapted to the underside of the strip foil.

The various part colour foils belonging to one and the same colour picture are stripped onto each one strip foil, and this stripping thereby has to take place with an extremely great accuracy so that the various part colour foils with great accuracy register with each other as regards their position on the strip foil, since there will otherwise arise an imperfect register in the ready print. Due thereto the strip work causes great difficulties and makes vary great demands on the accuracy and the skill of the operator. In spite of great accuracy in the stripping, an imperfect register frequently occurs in the printing and the imperfect registration may sometimes be of such a magnitude that the imperfect registering foil has to be restripped and a new printing form has to be made, which is of course both time consuming and expensive.

The present invention has for an object to overcome the above mentioned problems in conventional stripping of text or illustration foils onto strip foils, whereby the text and illustration foils as regards their position on their respective strip foils with great accuracy will register with each other, and the invention is in particular adaptable for stripping part colour foils of colour separated pictures in more colours.

The invention will now be described more in particular with reference to the accompanying drawings which are showing a preferred embodiment of an arrangement for executing the method according to the invention. It is however to be understood that the method thus described and the embodiment described and shown in the drawings is only an explanatory example and that various modifications may occur within the scope of the invention. The characteristics of the invention will further be evident of the accompanying claims.

Figure 3:
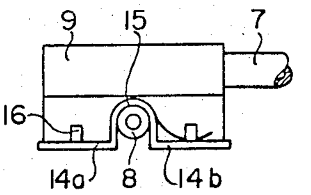
Figure 2:
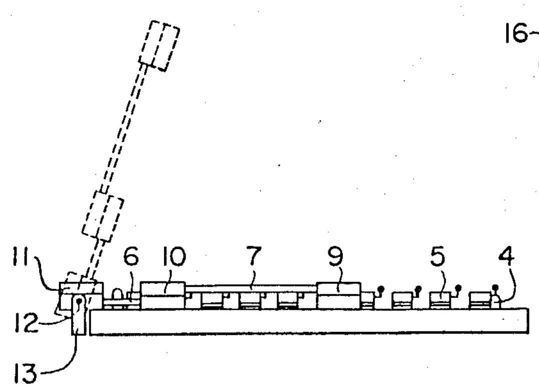

In the drawings FIG. 1 schematically shows a stripping table for executing the method according to the invention, seen from above, FIG. 2 shows the table according to FIG. 1 seen from right, FIG. 3 in an enlarged scale shows a holder for the foil to be mounted, seen from left in FIG. 1.

The arrangement according to the invention includes a mounting table 1 provided with a mounting arm 2 which is rotatably mounted on the mounting table in its one end and which is formed with a holder means 3 for the foil to be mounted in its other end.

The mounting table is preferably formed as a light table which may be provided with means for attaching a layout, one or more film foils, a strip foil or the like by means of vacuum. For the purpose of fitting and fixing a strip foil on the mounting table there are two or more fixing pins 4 provided at a suitable distance from each other preferably at or close to two opposite edges of the mounting table. Along a third side of the mounting table there are a number of punching means 5 mounted on line with each other and spaced a predetermined distance from each other. By means of the punches 5 the foil to be mounted can be formed with fixing holes, by means of which it can be adapted on the holder means 3.

The mounting arm 2 includes three links 6, 7 and 8 which are bound together by pivotable and lockable hinges 9 and 10. The hinges 9 and 10 are pivotable in a plane parallel to the longitudinal direction of the link arms. The link arm 6 is connected to the mounting table 1 over a hinge 11 which is also pivotable in a plane parallel to the link arms but which is further pivotably mounted about a horizontal axle 12, so that the whole system of link arms and hinges will be pivotable in a plane at right angle against the pivotal plane of the hinges. The axle 12 is mounted in brackets 13, which are connected to the mounting table 1.

The holder means 3 is detachably fixed at the link arm 8, and in the drawings it is shown to comprise a ruler with two horizontal branches 14a and 14b which are connected by a U-shaped clamp 15. The clamp 15 is of such a shape and size that it may easily be pushed down over the link arm 8 and be fixed thereto. Both branches 14*a* and 14*b* are formed with five fixing pins 16 the size and mutual disposition of which correspond to the punch holes which may be made by means of the punch means 5.

For preventing a film foil mounted on the fixing pins 16 from inadvertent loosening from said pins 16 there are a number of spring leaves or the like biassing the film foil down against the ruler 14*a* or 14*b*. Only one spring leaf has been indicated in FIG. 3 but it is obvious to the man skilled in the art how such spring leaves may be formed.

The purpose of the easy detaching of the holder means 3 is that it may easily be substituted by a holder means of other form or size or by a holder means the fixing pins of which are formed or located in another way.

From the drawings is not evident how the fixing of the holder means 3 against the link arm 8 takes place, but it is obvious for the man skilled in the art that such a fixing may for instance take place by means of pins radially extending from the link arm 8 and engaging corresponding holes in the clamp 15.

Each one of the hinges 9, 10 and 11 mainly comprises two axially upon each other located cylinders which are rotatable about a central axis with respect to each other. The link arm 6 interconnects the lower cylinders of the hinges 10 and 11, the link arm 7 interconnects the upper cylinders of the hinges 9 and 10, and the link arm 8 is connected to the lower cylinder of the hinge 9. The locking of the hinges for preventing a rotation between the upper and the lower cylinder may be established by any suitable means, but in a practical performance of the invention the hinges have been formed as pneumatic pressure boxes, where compressed air will thus establish the said locking. For example, the pneumatic pressure boxes which are more conventionally referred to as pneumatic clutches or pneumatic coupling devices may be of the type described in Swedish Pat. No. 207,897, issued on Nov. 23, 1960, adapted for the purposes set forth. Suitably the conduit of compressed air has thereby been located within the link arms 6 and 7, and the hinge 11 will be connected to a source of compressed air not shown in the drawings. A supply of compressed air through the link conduits 6 and 7 will thereby establish a locking at the same time of all three hinges 9, 10 and 11. A turning upwards of the whole holder system 2, 3 about the horizontal axle 12 will however not be prevented.

A mounting of a set of colour part foils to a colour separated picture will take place in the following manner:

In a colour separation camera of the kind where the film is adapted to be mounted on special fixing pins the various part colour film foils are separated with kept position of both camera and original colour picture. Thereby a set of part colour film foils will be obtained which completely register with each other with respect to their camera fixing holes. By means of said fixing holes the colour separated part colour film foils can be hooked onto the fixing pins 16 of the holder means 3. Usually more fixing holes, or fixing holes formed in another way, are desired rather than the ones obtained in the camera and in such a case all part colour film foils belonging to one and the same colour picture are mounted on special buttons so that the image carrying surfaces of the foils completely register with each other. The whole pack of part colour film foils is in this state brought under the punch means 5 and is formed with a suitable number of punch holes. A number of strip foils have in advance been formed with fixing holes corresponding to each other and to the fixing pins 4, and one of said strip foils 17 is now mounted on the pins 4 and may be further fixed at the mounting table by means of tape, from the underside acting vacuum or in any other suitable way. The first one in the set of the part colour films 18 is then mounted on the fixing pins 16 of one of the holder rulers 14*a* or 14*b* depending on where on the strip foil 17 that the part colour film 18 is intended to be attached. In the case shown in the drawings the part colour film 18 is mounted on the ruler 14*b* and the holder means with the film mounted thereon is then moved in over the strip foil 17 and is fit into correct position on said strip foil 17. This fitting may as previously mentioned take place by means of a pattern drawn onto the strip foil or by means of a layout or the like positioned between the mounting table 1 and the strip foil 17. When the part colour film 18 has been correctly positioned on the strip foil 17 compressed air is supplied to the hinges 9, 10 and 11, whereby said hinges will be locked and the holder means 3 together with the film foil 18 attached thereto will be fixed in a determined horizontal position on the strip foil 17. The part colour film foil 18 is in the conventional manner attached to the strip foil 17 by means of points of glue, tape or the like. The mounting position is in FIG. 1 indicated by dotted lines.

After the fixing of the colour film foil 18 it is released from the holder ruler 14*b*, and if needed the part of the colour film foil having fixing holes is also cut away. This is necessary if several films having text or illustrations are to be mounted close to each other on one and the same strip foil.

The complete system of mounting arm 2 and holder means 3 is then folded up about the horizontal axle 12 into the position indicated with the dotted lines in FIG. 2, the strip foil 17 with the colour film foil 18 attached thereto is taken away from the mounting table and a new strip foil is mounted on the pins 4. The folding up of the mounting arm 2 and the holder means 3 has taken place with hinges 9, 10 and 11 locked, and when the next part colour film foil in the set of part colour foils of one and the same colour picture is adapted on the holder ruler 14*b* and the mounting arm 2 is folded down against the mounting table this second part colour foil will be located on the new strip foil in exact correspondance to the location of the first part colour foil on the first strip foil. The colour film foil is attached to the strip foil in the above described manner, and in the same way is the rest of the part colour foils in the set mounted each on one strip foil.

In case several colour pictures shall be printed from the same colour printing plate the above mentioned first strip foil is once again mounted on the mounting table together with the first part colour film foil 18 already attached thereto, and in the same manner as described above the new part colour film foil is attached to a strip foil as indicated with the pointed broken line in FIG. 1.

It is obvious to the man skilled in the art, what advantages may be obtained with the method and the arrangement according to the invention in mounting not only colour separated more colour film foils but also in mounting text, where a given text register is wanted between the various printing pages or in mixed mounting of text and illustrations.

What we claim is:

1. Method of mounting text or illustration film foils, in particular part colour film foils of colour separated colour pictures, onto a number of strip foils (17) so that the various part colour film foils (18) of one and the same picture with great accuricy register with each other, thereby characterized that the strip foils (17) are formed with fixing holes or the like corresponding to each other and by means (4) corresponding to the fixing holes or the like they are mounted one at the time in a fixed position on a mounting table (1) provided with a mounting arm (2, 3) which is lockably adjustable in the horizontal plane and in said locked position upwardly pivotable about a fixed pivote axle (12), and a part colour film foil (18) of a colour picture or the like in the conventional manner formed with fixing holes is mounted in means (3) adapted for this purpose in the free end of the mounting arm (2), the mounting arm (2) together with the part colour film foil (18) is fit into a determined position in relation to the strip foil (17), a mounting arm (2) is locked in the adjusted position and the part colour film foil (18) is in the conventional manner attached to the strip foil and is then released from the mounting arm, and the mounting arm is in a still locked position fold up about its fixed pivote axle (12), the stripping (17, 18) thus prepared is replaced by a new strip foil (17) which by means of its fixing holes or the like is mounted on the mounting table in exact correspondance to the previous strip foil, and a new part colour film foil is mounted on the mounting arm by means of its fixing holes in exact correspondance with the previous part colour film foil, whereupon the mounting arm (2) is fold down and the new part colour film foil is attached to the new strip foil what will unconditionally take place in exact register with the previous stripping.

2. An apparatus as claimed in claim 1 wherein said mounting arm comprises first, second and third links and hinge means, pivotable in a horizontal plane, for connecting pairs of said links together, said apparatus further including further horizontally pivotable hinge means connected to the mounting table and to said first link, the free end of said third link being connected to said means for carrying a film foil.

3. An apparatus as claimed in claim 2 wherein said locking means comprises means for locking said hinge means to prevent relative twisting movement between the links themselves and between the links and the mounting table.

4. An apparatus as claimed in claim 3 wherein said hinge means comprise pneumatically lockable pressure devices.

5. An apparatus as claimed in claim 4 wherein the means for carrying the film foil comprises first and second rulers, means for fixing the position of the film foil thereon and a downwardly opening U-shaped clamp for detachably mounting said carrying means on said mounting arm.

6. An apparatus as claimed in claim 5 wherein said foil position fixing means comprises a plurality of projecting pins, the film foil being formed with punched holes corresponding to said pins.

7. An apparatus as claimed in claim 4 wherein said links are tubular in form and serve as conduits for the pressure medium of the pressure devices.

* * * * *